United States Patent [19]
Jörlöv et al.
[11] Patent Number: 4,804,858
[45] Date of Patent: Feb. 14, 1989

[54] POWER SUPPLY CIRCUIT FOR A DIODE ADAPTED TO EMIT LIGHT IN DEPENDENCE OF THE PREVAILING SURROUNDING LIGHT

[75] Inventors: Richard Jörlöv, Lomma; Lars Nyström, Veberöd; Sixten Lewenhaupt, Malmö, all of Sweden

[73] Assignee: Aimpoint AB, Malmo, Sweden

[21] Appl. No.: 174,780

[22] Filed: Mar. 29, 1988

[30] Foreign Application Priority Data

Apr. 8, 1987 [SE] Sweden ................................ 8701462

[51] Int. Cl.[4] ................................................ H02J 7/00

[52] U.S. Cl. ....................................... 307/66; 323/906; 250/214 AL; 250/206

[58] Field of Search ............... 323/299, 300, 303, 902, 323/906; 307/64, 66, 86; 250/214 AL, 206, 209; 315/155, 158

[56] References Cited

U.S. PATENT DOCUMENTS

| | | | |
|---|---|---|---|
| 1,938,184 | 12/1933 | Kwartin . | |
| 3,700,336 | 10/1972 | Clegg | 356/226 |
| 4,136,309 | 1/1979 | Galberth et al. | 323/906 |
| 4,163,150 | 7/1979 | Stankewitz | 250/205 |
| 4,273,990 | 6/1981 | Pierpoint | 250/205 |
| 4,314,198 | 2/1982 | Rogers | 323/906 |
| 4,330,706 | 5/1982 | Lawenhaupt | 250/214 AL |
| 4,714,868 | 12/1987 | Maruyama et al. | 323/906 |
| 4,725,740 | 2/1988 | Nakata | 307/66 |
| 4,742,291 | 5/1988 | Bobier et al. | 323/906 |

*Primary Examiner*—Peter S. Wong
*Attorney, Agent, or Firm*—Laurence R. Brown

[57] ABSTRACT

A power supply circuit for a light emitting diode may be adjusted automatically by the voltage of a solar cell which is a power source in the circuit by including in the circuit a series connected current regulator governed by said voltage of said solar cell.

6 Claims, 1 Drawing Sheet

POWER SUPPLY CIRCUIT FOR A DIODE ADAPTED TO EMIT LIGHT IN DEPENDENCE OF THE PREVAILING SURROUNDING LIGHT

This invention relates to a power supply circuit for a diode adapted to emit light in dependance of the prevailing surrounding light. A power supply circuit of this type may be used e.g. in aiming devices for firearms in which a light beam from the diode is reflected axially through a scope. By such application it is a must that the power supply of the circuit—usually a battery—has a very long lifetime. In cases such demands should be met by the battery and in case the application often is realised in bright surrounding light, it is common practise to include a solar cell in parallel to the battery.

The present invention has for its object to provide a circuit in which a solar cell is connected in parallel to a battery, said solar cell and said battery being connected in series with the diode, and in which the solar cell is primarily used as power source during bright surrounding light.

This is according to the present invention obtained thereby that the said series connection further comprises a current regulator influenced by the voltage of the solar cell.

Figure 1:
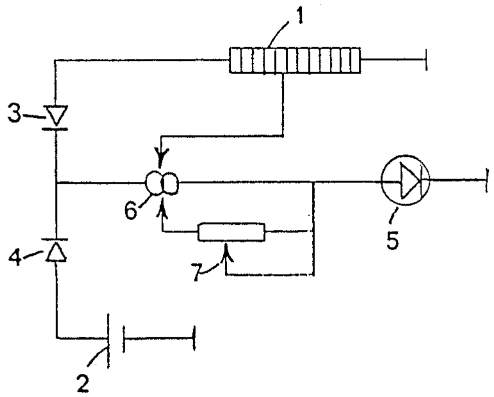
Figure 2:
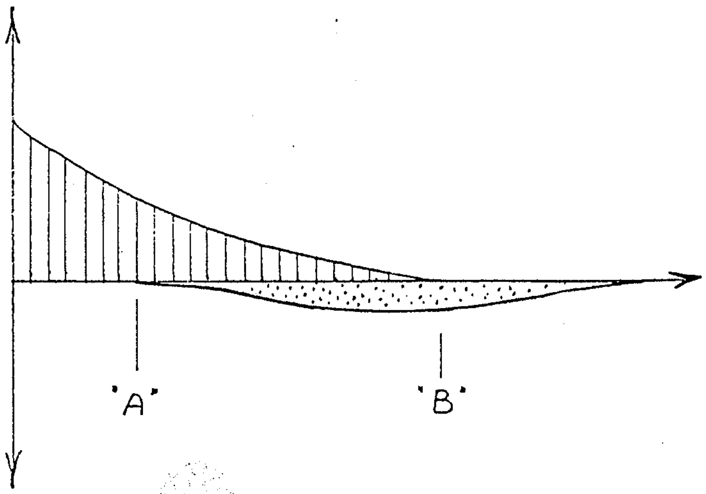

The invention will be explained below in more detail reference being made to the accompanying drawing in which FIG. 1 shows a wiring diagram for a power supply circuit, and in which FIG. 2 shows the current delivered by the solar cell and the battery as a function of the intensity of the surrounding light.

In FIG. 1 the reference numeral 1 designates a solar cell connected in parallel to a battery 2. Two diodes 3 and 4 prevent that the solar cell passes a current through the battery and vice versa. A light emitting diode 5 and a current regulator 6 are connected in series to the power sources 1, 2. The current regulator 6 is of the type LM 117 T made by National Semiconductor. It will deliver a current according to a voltage input primarily set by the solar cell 1. The voltage of the solar cell is a function of the energy radiated into the cell. In case of intensive solar radiation the light emitting diode 5 should produce maximum light. With decreasing surrounding light less current should be supplied to the diode 5, but the capacity of the solar cell 1 is not sufficient at any magnitude of the light. At dusk and in darkness current from the battery 2 is needed. The current from the battery 2 is also governed by the regulator in accordance with the intensity of the surrounding light measured by the voltage of the solar cell even when said solar cell 1 is delivering little or no current to the diode 5. Only in case of almost complete darkness a potentiometer 7 is used for manually governing the current from the battery 2 to the diode.

FIG. 2 shows the current delivered to the light emitting diode 5 as a function of the intensity of the surrounding light. The ordinates upwardly show the current from the solar cell 1, while the ordinates downwardly show the current delivered from the battery 2. The abscissae indicate maximum surrounding light at the left hand end and show decreasing light (in lux) in the direction of the axis to the right.

As long as the intensity of the insolation is greater than "A" the power supply is solely effected by the solar cell 1. At intensities between "A" and "B" power from the battery 2 concurrently is supplied, but at low intensity —less than "B"—the power supply is solely provided by the battery 2.

The voltage of the solar cell 1 is governing the current regulator 6 to deliver less current with decreasing intensity of the surrounding light. Only at very poor surrounding light the solar cell 1 will be unable to so function and the current supply must be governed in a different way. The governing voltage to the current regulator 6 is then provided by the manually adjustable potentiometer 7.

The power supply circuit shown in FIG. 1 will operate as follows:

At bright insolation—a case which calls for maximum light emission of the light emitting diode 5—the solar cell 1 delivers a higher voltage than the battery 2. The voltage of the solar cell 1 is a function of the insolation and, therefore, said voltage may be used for governing the current regulator 6.

As will be seen from FIG. 2 this will cause the power supply to be delivered primarily from the solar cell 1 at intensive insolation conditions—corresponding to daylight. At dusk the power supply is mostly derived from the battery 2, but during such conditions the light emitting diode 5 shall only emit a faint light dimmed automatically by the solar cell 1 or manually by the potentiometer 7. The total effect will be that the battery life is prolonged several times as use during daylight is more common than during darkness. The potentiometer 7 may be combined with a manual switch (not shown).

We claim:

1. A system for variably controlling light emission from a light emitting diode independence upon the prevailing surrounding light, comprising in combination, a light emitting diode that emits light in response to the magnitude of current flow therethrough, a current producing solar cell coupled to pass current flow through the diode independence upon the prevailing surrounding light, a battery coupled to produce current flow through the diode only in lower light conditions when the solar cell does not produce enough current to produce a corresponding magnitude of current flow through the diode to vary the light emitted from the diode in response to the lower levels of the surrounding light, and a current regulator influenced by the solar cell to control the battery current flow through the diode independence upon the surrounding light in the lower levels of the surrounding light.

2. The system of claim 1 further comprising battery life extension means comprising means limiting battery discharge of current to said battery current through the diode.

3. The system of claim 1 further comprising means preventing the current from the solar cell to flow into the battery.

4. The system of claim 1 further comprising manually adustable means for producing current flow to the diode through the regulator at lower light conditions.

5. The system of claim 1 wherein the system responds to said current regulator, in a range of surrounding light intermediate between that producing sole current to the light emitting diode from the solar cell and sole current to the light emitting diode from the battery, to share current flow at a variable magnitude responding to the solar cell in dependence on the surrounding light.

6. A system for controlling the light emitted from a light emitting diode, comprising in combination, a battery, a solar cell, current flow restriction means coupling the battery and solar cell to prevent current flow therebetween, a light emitting diode coupled to both said battery and said solar cell to receive current from both the battery and the solar cell through the current flow restriction means in response to the respective voltages of the solar cell and battery, and current regulating means coupled for variable response to the solar cell to regulate the current flow through the light emitting diode in dependence upon surrounding light.

* * * * *